US006799047B1

(12) United States Patent
Bahl et al.

(10) Patent No.: US 6,799,047 B1
(45) Date of Patent: Sep. 28, 2004

(54) LOCATING AND TRACKING A USER IN A WIRELESS NETWORK THROUGH ENVIRONMENTALLY PROFILED DATA

(75) Inventors: Paramvir Bahl, Issaquah, WA (US); Venkata N. Padmanabhan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/513,355

(22) Filed: Feb. 25, 2000

Related U.S. Application Data (60) Provisional application No. 60/121,612, filed on Feb. 25, 1999.

(51) Int. Cl.[7] .................................................. H04Q 7/20
(52) U.S. Cl. .................................... 455/456.1; 455/67.1
(58) Field of Search ................................. 342/457, 464, 342/357.13; 455/456, 506, 505, 423, 67.11, 67.16, 115.1, 226.1, 456.1

(56) References Cited

U.S. PATENT DOCUMENTS

| | | | |
|---|---|---|---|
| 5,394,158 A | * | 2/1995 | Chia .......................... 342/457 |
| 5,613,205 A | | 3/1997 | Dufour |
| 5,666,662 A | | 9/1997 | Shibuya |
| 5,717,688 A | | 2/1998 | Belanger et al. |
| 5,732,354 A | | 3/1998 | MacDonald |
| 5,745,865 A | | 4/1998 | Rostoker et al. |
| 5,873,040 A | | 2/1999 | Dunn et al. |
| 6,140,964 A | * | 10/2000 | Sugiura et al. ............. 342/464 |
| 6,167,274 A | * | 12/2000 | Smith ..................... 342/357.01 |
| 6,236,365 B1 | * | 5/2001 | LeBlanc et al. ............ 342/457 |

FOREIGN PATENT DOCUMENTS

| | | |
|---|---|---|
| DE | 19710040 | 9/1998 |
| EP | 0698976 | 2/1996 |
| EP | 9815149 | 4/1998 |
| EP | 0930514 | 7/1999 |
| GB | 2311697 | 10/1997 |

OTHER PUBLICATIONS

R. Azuma, *Tracking Requirements for Augmented Reality*, Communications of the ACM, vol. 36, No. 7, pp. 50–51, Jul. 1993.

(List continued on next page.)

*Primary Examiner*—Tu Nguyen
*Assistant Examiner*—Nay Maung
(74) *Attorney, Agent, or Firm*—Leydig, Voit & Mayer, Ltd.

(57) ABSTRACT

A method for locating a user in a wireless network is disclosed. A mobile computer which seeks to determine its location within a building detects the signal strength of one or more wireless base stations placed at known locations throughout the building. An environmentally profiled table of known locations within the building and the base station signal strength at those locations is searched to find the stored signal strength most similar to the signal strength detected. The location corresponding to the most similar stored signal strength is determined to be the current location of the mobile computer. The table can be derived empirically, by placing a mobile computer at the known locations and measuring the signal strength of the wireless base stations at those locations, or it can be derived mathematically by taking into account a reference signal strength, the distance between the reference point and the known location, and the number of intervening walls between the reference point and the known location. As an alternative, the base stations can measure the signal strength of the mobile computer. In such a case, the table would relate a known position of the mobile computer to the signal strength of the mobile computer as measured by the one or more base stations. Environmental profiling is achieved by comparing several different tables, corresponding to several different environments, and using the table that minimizes the error. Environmental profiling can be applied to tables determined empirically or mathematically.

46 Claims, 6 Drawing Sheets

OTHER PUBLICATIONS

S. Berchtold et al., *The X–Tree: An Index Structure for High Dimensional Data*, Proceedings of the Twenty–second International Conference on Very Large Data Bases, Sep. 3–6, 1996.

S.F. Fortune et al, *WISE Design of Indoor Wireless Systems*, IEEE Computational Science and Engineering, vol. 2, No. 1, pp. 58–68, Spring 1995.

P. Enge et al., *Scanning the Issue/Technology: Special Issue on Global Positioning System*. Proceedings of the IEEE, vol. 87, No. 1, pp. 3–15, Jan. 1999.

A. Harter et al, *A Distributed Location System for the Active Office*IEEE Network, vol. 8, No. 1, Jan./Feb. 1994.

H. Hashemi, *The Indoor Radio Propagation Channel*, Proceedings of the IEEE, vol. 81, No. 7, pp. 943–968, Jul. 1993.

T.D. Hodes et al., *Composable Ad Hoc Mobile Services for Universal Interaction*, MobiCom '97 Proceedings of the Third Annual ACM/IEEE International Conference on Mobile Computing and Networking, pp. 1–12, Sep. 26–30, 1997.

H. Maass, *Location–Aware Mobile Application Based on Directory Services*, MobiCom '97 Proceedings of the Third Annual ACM/IEEE International Conference on Mobile Computing and Networking, pp. 23–33, Sep. 26–30, 1997.

S.O. Rice, *Mathematical Analysis of Random Noise*, Bell Systems Technical Journal, vol. 23, pp. 282–332, 1944.

S.O. Rice, *Mathematical Analysis of Random Noise*, Bell Systems Technical Journal, vol. 24, pp. 46–156, 1945.

Digital Equipment Corporation, *Digital RoamAbout 915/2400 DS/PC Card and ISA Network Adapter: Installation and Configuration*, Apr. 1996.

T. Seidi et al., *Optimal Multi–Step k–Nearest Neighbor Search*, Proceedings of ACM Sigmod International Conference on Management of Data, vol. 27, Issue 2, Jun. 1998.

S.Y. Seidel, *914 MHz Path Loss Prediction Model for Indoor Wireless Communications in Multi–Floored Buildings*, IEEE Transactions on Antenna and Propagation, vol. 40, No. 2, pp. 207–217, Feb. 1992.

S. Tekinay, *Wireless Geolocation Systems and Services*, IEEE Communications Magazine, p. 28, Apr. 1998.

R. Want et al, *The Active Badge Location System*, ACM Transactions on Information Systems, vol. 40, No. 1 pp. 91–102, Jan. 1992.

P. Bahl et al, *User Location and Tracking in an In–Building Radio Network*. Technical Report MSR–TR–99–12, Feb. 25, 1999.

Lucent Technologies Inc., *WaveLAN Frequency Channel Management Guidelines. . . in the Americas: WaveLAN 915 MHz and 2.4 GHz*, 1999.

Lucent Technologies Inc., *WaveLAN Sales Bulletin: What is IEEE 802.11 Compliance*, May 1998.

B. Maxson et al., *WLAN Technology and the IEEE 802.11 Standard fl* [web page], Feb. 20, 1998. http://www.rose–hulman.edu/~maxsonbd/80211htm. [Accessed Apr. 3, 1999].

J. Foley et al., *Computer Graphics Principle and Practice*, Second Edition, Addison–Wesley Publishing Company: Reading, Massachusetts, 1999.

Wim Diepstraten, *802.11 Tutorial*, Lucent Technologies, Inc., Mar. 1996.

Lucent Technologies, Inc., *WaveLAN Wirless LAN Technology and Market Backgrounder*, 1999.

U.S. Wireless *U.S. Wireless Technology; Location Fingerprinting™ and the RadioCamera™ System* [web page], 1999, http://www.uswcorp.com/uswcmainpages/ourhtm. [Accessed Nov. 17, 1999].

Lucent Technologies, Inc., *WaveLAN Sales Bulletin: Mobile Connectivity*, Aug. 1997.

Lucent Technologies, Inc., *WaveLAN Sales Bulletin: Radio Frequency Interference*, Aug. 1997.

J. Werb, *The Practical Engineer: Designing a Positioning System for Finding Things and People Indoors*, IEEE Spectrum, Sep. 1998.

\* cited by examiner

LOCATING AND TRACKING A USER IN A WIRELESS NETWORK THROUGH ENVIRONMENTALLY PROFILED DATA

This application claims the benefit of provisional application 60/121,612 filed Feb. 25, 1999.

TECHNICAL FIELD

This invention relates generally to determining the location of an object and tracking the object and, more particularly, relates to locating and tracking a user of a wireless network.

BACKGROUND OF THE INVENTION

Advances in the Global Positioning System (GPS) have provided non-military users an inexpensive and portable location and tracking device. Currently the GPS system is used to provide directions to drivers through an in-vehicle system, provide location and tracking information for marine navigation, and allow shipping companies to locate and track individual shipments. However, the GPS system is severely limited in an indoor environment.

The GPS system relies on the timing of signals from GPS satellites received by individual GPS units on the ground. Thus, an unobstructed view to the satellites is necessary to receive the signal. In an indoor environment, such an unobstructed view is, in general, not possible to obtain. Furthermore, the principal objective in developing GPS was to offer the United States military accurate estimates of position, velocity and time. Civil users of GPS were to be provided only "reasonable" accuracy consistent with national security concerns. As a result, satellite signals are purposefully degraded under a government policy called Selective Availability and consequently the resolution provided by the system is no more than 100 meter for civilian users. This coarse resolution is inadequate for many applications and compounds the problem of the ineffectiveness of GPS indoors.

Because of these limitations, other technologies have been developed to locate and track users or objects in an in-building environment. One such system uses tags placed on the items that are to be tracked. The tags can be either active or passive. An active tag contains power circuitry, which can communicate with base stations. A passive tag contains no internal power, rather it is charged either inductively or electromagnetically as it passes within the range of a base station. Using this derived power, the passive tag communicates with the station. The base stations are physically linked together through a wired or wireless network. Each tag transmits a code uniquely identifying itself. Thus, the location of the tag is determined to be in the vicinity of the base station with which the tag last communicated.

Such tag-based tracking and location systems, while being useful in an in-building environment, require a significant installation of specialized base stations. A tag-based system can only determine the location of the tags as being "near" a particular base station, consequently, to achieve a sufficiently high resolution a large number of base stations must be installed. Obtrusive tags have to be placed on every item that is to be tracked or located, and in the case of infra-red tags, the system operates only when there is a "line-of-sight" between the tag and a base station. For all these reasons location-determination technology based on tags has had very limited success.

SUMMARY OF THE INVENTION

Therefore, the present invention is generally directed to a system for locating and tracking a user in a building without a specialized infrastructure and with the ability to track without a line-of-sight between the user and a base station.

The present invention is also generally directed to a system for locating and tracking a user in a building using the existing Radio-Frequency (RF) Wireless Local Area Network (WLAN) infrastructure.

A Wireless Local Area Network (WLAN) consists of base stations connected to a wired network, and mobile devices which are "connected" to the WLAN through wireless communication with the base stations. The present invention uses the signal sensing ability of both the base station and the mobile device to determine the location of the mobile device, and thus the location of the user of the mobile device. The strength of the received signal from several base stations is measured by the mobile device. The mobile device then compares the signal strength from each of the base stations to a pre-computed table containing the base stations' signal strength at various known locations of the mobile device. From this comparison, the mobile device determines its location. Alternatively, the signal strength from the mobile device can be measured at a number of base stations. This signal strength is then compared by a central computer to a pre-computed table containing the mobile computer's signal strength at the base stations for various known locations of the mobile computer. From this table, the central computer determines the location of the mobile computer.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types.}

Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
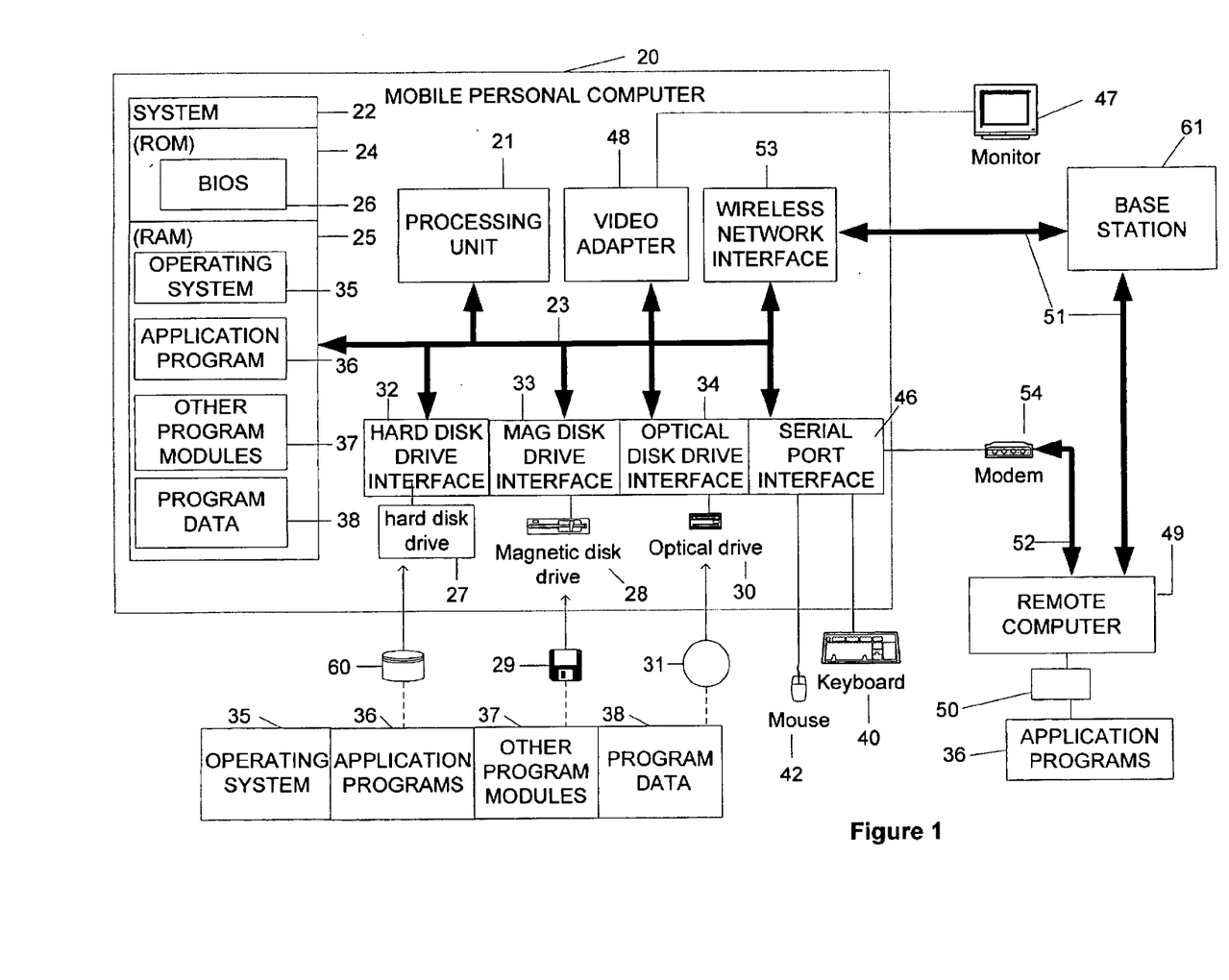
FIG. 1 is a block diagram generally illustrating an exemplary computer system on which the present invention resides.

With reference to FIG. 1, an exemplary system for implementing the invention includes a general purpose computing device in the form of a conventional mobile personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the mobile personal computer 20, such as during start-up, is stored in ROM 24. The mobile personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the mobile personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more application programs 36, other program modules 37, and program data 38. A user may enter commands and information into the mobile personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The mobile personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the mobile personal computer 20, although only a memory storage device 50 has been illustrated in FIG. 1. The logical connections depicted in FIG. 1 include a Wireless Local Area Network (WLAN) 51 and a wide area network (WAN) 52. Such networking environments are commonplace in offices, enterprise-wide computer networks, intranets and the Internet.

When used in a WLAN networking environment, the mobile personal computer 20 is connected to the local network 51 through a wireless network interface or adapter 53. The wireless interface 53 transmits wireless packets to a base station 61. The base station 61 can then retransmit the packets, either through a wired or wireless network to the remote computer 49. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the mobile personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
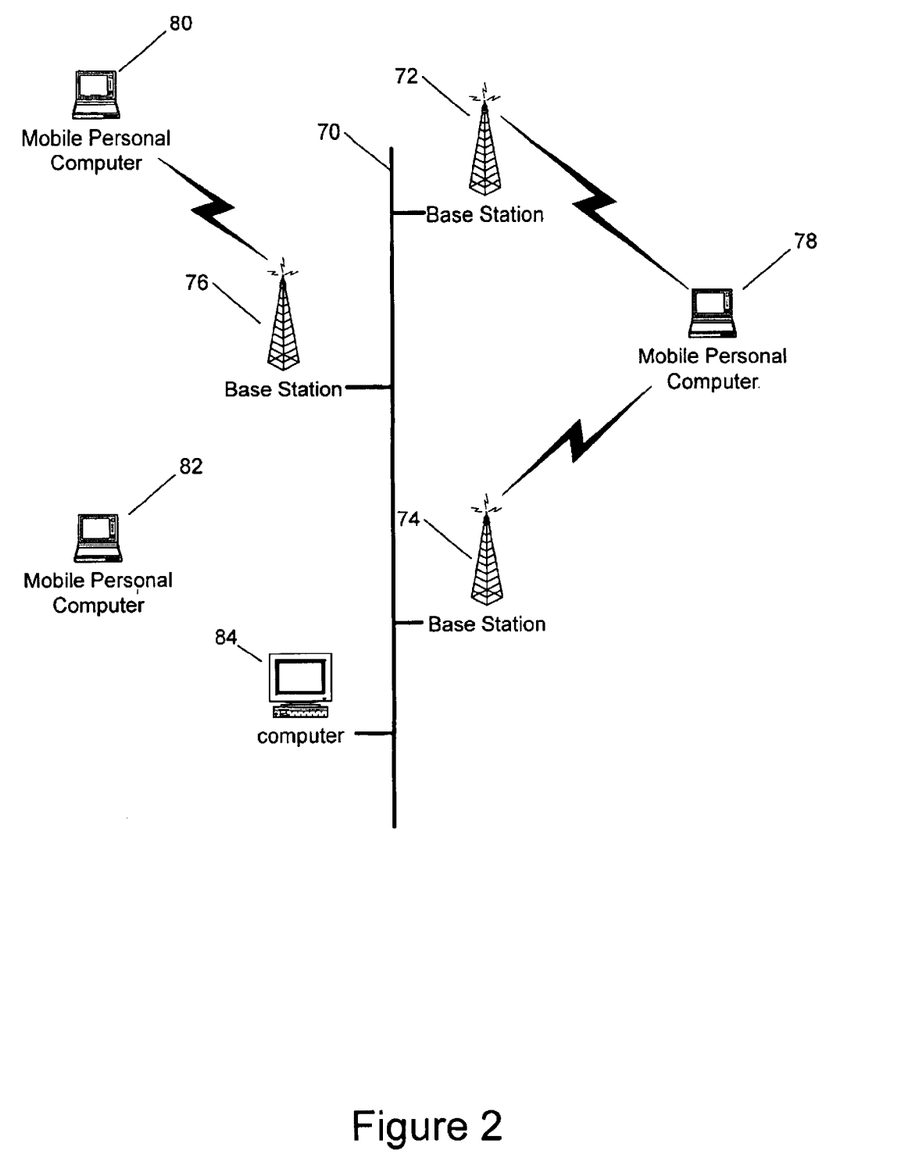
FIG. 2 is a diagram generally illustrating a wireless network according to the present invention.

In accordance with the invention, an exemplary WLAN is shown in FIG. 2. The base stations 72, 74, and 76 are the same as base station 61 in FIG. 1, however, for clarity, each base station has been separately numbered so that each can be referred to individually. Similarly, mobile personal computers 78, 80, and 82 are all of the same type as mobile personal computer 20 described above. With reference to FIG. 2, the mobile computer 78 can communicate, via wireless communication, with either base station 72 or base station 74 as shown. In a known manner, the mobile computer 78 can select the base station which provides the highest signal strength, measured by the signal-to-noise ratio (SNR). The base stations 72, 74, and 76 can be connected by connection 70, which can be either a wired or wireless network. Therefore, to link two computers together, the WLAN passes messages through the base stations. For example, to communicate with mobile computer 80, mobile computer 78 can contact either base station 72 or base station 74. These base stations will then relay the message, through connection 70, to base station 76, which is the base station with which mobile computer 80 may currently be communicating. Base station 76 will then transmit the message to mobile computer 80, completing the wireless connection between mobile computers 78 and 80.

Because the mobile computers 78, 80, and 82 can be transported, the WLAN defines a mechanism by which communication between the mobile computers and the WLAN is transferred from one base station to another. The mobile computers 78, 80, and 82 monitor the signal strength of the base stations 72, 74, and 76. In some embodiments the mobile computers continuously monitor the signal strength, and in others, the mobile computers only monitor the signal strength when the SNR of the base station with which the mobile computer is currently communicating falls below an acceptable level. Similarly, to detect and connect to mobile computers as they are transferred between base stations, the base stations 72, 74, and 76 monitor the signal strength from the mobile computers 78, 80, and 82. A more detailed description of how the mobile computers are passed between base stations can be found in U.S. Pat. No. 5,717,688 entitled WIRELESS LOCAL AREA NETWORK WITH ROAMING INDICATING MULTIPLE COMMUNICATION RANGES by Belanger et al., the teachings of which are incorporated herein by reference in their entirety.

Figure 3:
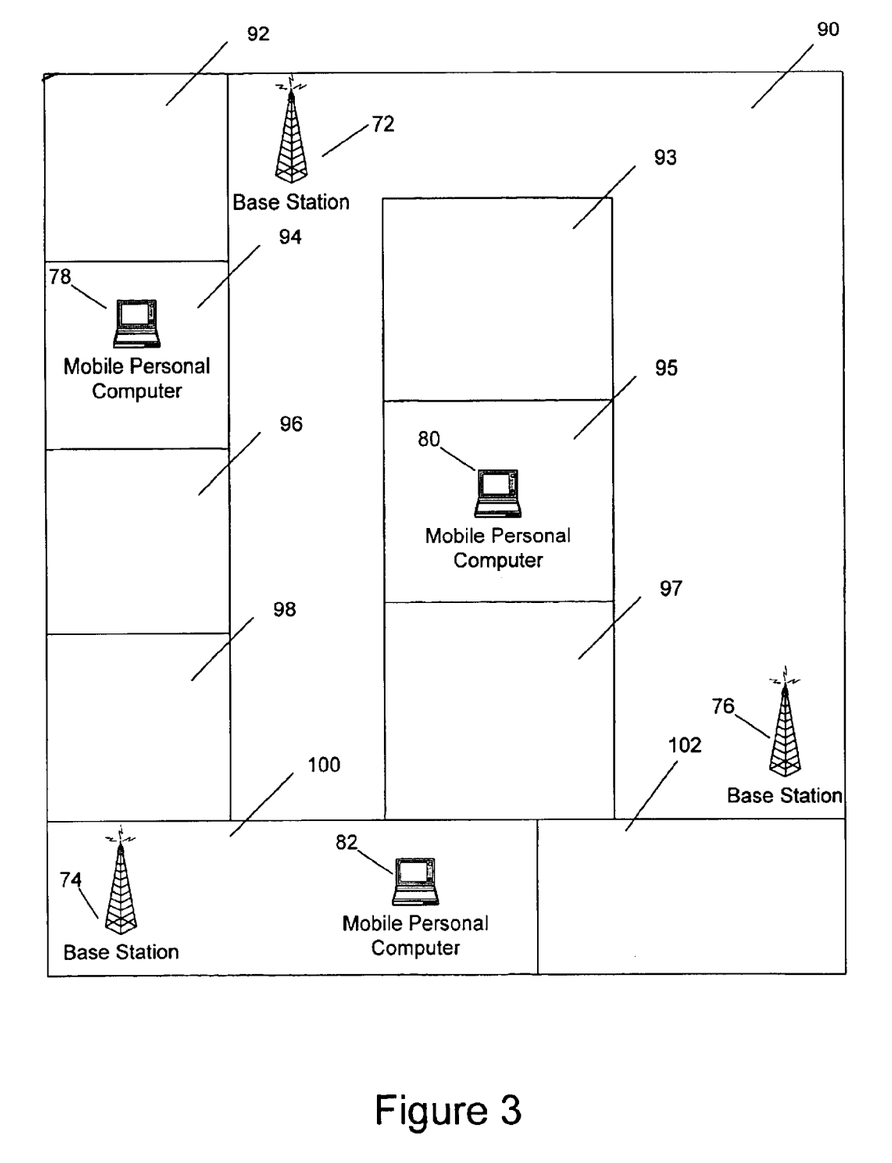
FIG. 3 is a diagram generally illustrating a wireless network on one floor of an office building.

The present invention uses this monitoring of signal strength by both the base stations and the mobile computers, to locate and track a mobile computer and its user. An exemplary building layout is shown in FIG. 3. The building includes hallway 90; offices 92, 93, 94, 95, 96, 97, and 98; and conference rooms 100 and 102. Base stations 72, 74, and 76 have been placed at various locations in the building. The mobile personal computers 78, 80, and 82 are also in the building, although they can move freely throughout the building.

The mobile personal computer 78 can monitor the strength of the signal from base stations 72, 74, and 76. As is known by those of skill in the art, the signals of a WLAN are attenuated as they propagate and as they pass through walls. Therefore, as monitored by mobile computer 78, the signal from base station 72 is stronger than the signals from base stations 74 and 76. This is because the signals from base stations 72 and 74 must travel a greater distance and must pass through more walls.

The signal strength from base stations 72, 74, and 76 will vary as the mobile computer 78 is moved around the building. For example, if the user of mobile computer 78 moved the computer into conference room 100, the signal strength of base station 74 as detected by mobile computer 78 would increase, as the distance between base station and mobile computer decreased, and as there would no longer be any walls between them. Similarly, the signal from base station 76, as detected by mobile computer 78, would increase in strength due to the decreased distance and decreased number of intervening walls. However, the signal from base stations 72 would decrease, since mobile computer 78 would move further away. Therefore, it is possible to create a table listing known locations in the building, and the corresponding signal strengths from each of the base stations as received at those locations.

Figure 4:
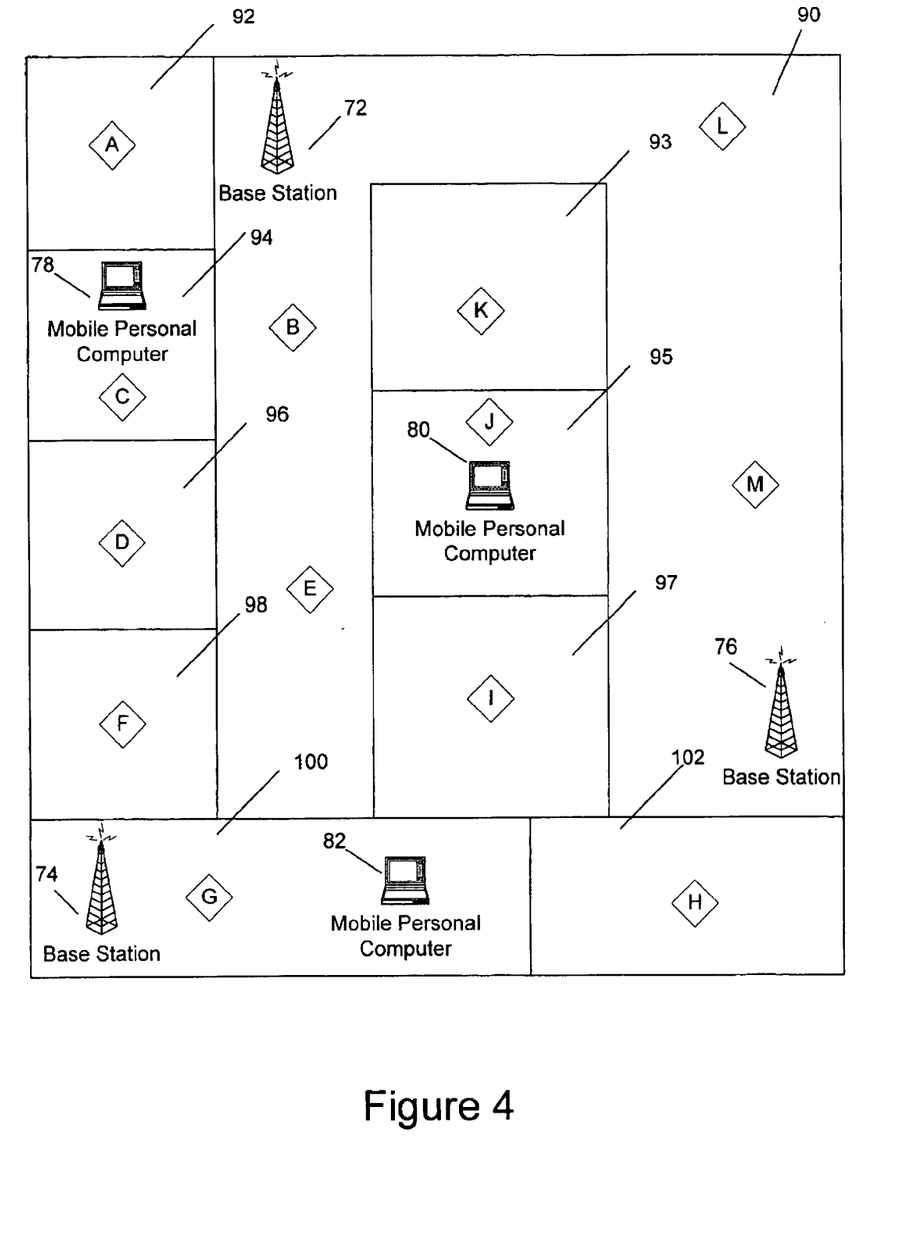
FIG. 4 is a diagram generally illustrating the locations of empirical determinations of signal strength according to the present invention.

Turning to FIG. 4, a method for creating the location versus signal strength table is shown. In FIG. 4, diamonds with letters in them indicate locations where empirical measurements of the signal strength of the base stations 72, 74, and 76 have been taken. These measurements can then be compiled into a table, such as Table 1, shown below. Thus, location B has a higher SNR for base station 72 than location A because, while both are approximately equidistant from base station 72, location A is separated from the base station by the wall of office 92. The observation that distance and intervening walls decrease the signal strength, and thus decrease the SNR, is true for the rest of the entries in the table as well.

TABLE 1

| Location | SNR from Base 72 | SNR from Base 74 | SNR from Base 76 |
| --- | --- | --- | --- |
| A | 40 dB | 20 dB | 20 dB |
| B | 45 dB | 30 dB | 30 dB |
| C | 35 dB | 25 dB | 25 dB |
| D | 30 dB | 30 dB | 30 dB |
| E | 40 dB | 35 dB | 35 dB |
| F | 25 dB | 40 dB | 30 dB |
| G | 25 dB | 45 dB | 35 dB |
| H | 20 dB | 40 dB | 40 dB |
| I | 25 dB | 35 dB | 40 dB |
| J | 30 dB | 30 dB | 35 dB |
| K | 35 dB | 25 dB | 30 dB |
| L | 40 dB | 20 dB | 40 dB |
| M | 25 dB | 30 dB | 45 dB |

The strength of the radio frequency signals measured by the base station 76 or the mobile computer 20 can vary as a function of the orientation of the mobile computer 20 when performing the measurements. More particularly, the orientation of the computer is related to the position of the user, and it is the user's body that can create a significant difference in the detected signal strength. It is therefore necessary that the table used in determining the location of the mobile computer take this effect into account and be able to determine the location regardless of the orientation of the user with respect to the mobile computer. One method for taking this effect into account is to consider multiple orientations of the user's body to minimize the effects of signal attenuation due to the user's body.

The present invention also contemplates multiple measurements at each location to remove the effect of the random variables, such as air currents and radio interference, that can affect signal quality. Because these events are often short lived, multiple samples taken at one location over a period of time will yield different results. To remove the effect of the random variables, the calculated signal strength values over a period of time are averaged. This average value is then used in a table, such as Table 1 above. In such a manner the accuracy of the table, and thus the location determination, is enhanced.

Once a table relating signal strength to the position of the mobile computer 20, such as Table 1, is created, the mobile computer 20 can determine its location by finding the row of the table which most closely corresponds to the signal strengths detected by the mobile computer. For example, mobile computer 78 might detect a SNR of 38 dB from base station 72, 23 dB from base station 74, and 24 dB from base station 76. By comparing these values to Table 1, the mobile computer 78 determines that it is located at physical position C. This determination can be done in signal space. The signal space is an multi-dimensional space where the number of dimensions is equivalent to the number of base stations' signals which the mobile computer uses to determine its location. In Table 1 above, three base stations' signal strengths are determined at each physical location, so the signal space is a three-dimensional space. As will be known by those skilled in the art, unlike physical space, the signal space is not limited to three dimensions.

Each set of three measured signal strengths from the three base stations can define a point in the signal space. In one realization of this invention, the Euclidean distance between the point defined by the measured signal strengths and the points defined by the empirically derived signal strengths in Table 1 can be calculated. As is known by those of skill in the art, the Euclidean distance is the square root of the sum, over all the dimensions, of the difference between two points in each dimension, squared. In mathematical terms, the Euclidean distance, d, is defined as:

$$d = \sqrt{\sum_{i=1}^{n} (a_i - b_i)^2},$$

where $a_i$ is the value for the ith coordinate of point a and $b_i$ is the value of the ith coordinate of point b, and n is a variable equivalent to the number of dimensions in the signal space. The physical location of the mobile computer 20 is determined to be the same as the location whose corresponding empirically derived signal strengths in the table are the closest (as defined above) to the measured signal strengths. Thus, for the measured signal strengths of 68 dB, 53 dB, and 54 dB given as an example above, the location of mobile computer 78 would be determined to be location C. This is because the Euclidean distance in signal space between (38,23,24), which are the measured values, and (35,25,25), the stored values at point C, which were determined empirically during system set-up, is less than the Euclidean distance between (38,23,24) and any other point in the table. The mobile computer 20 therefore concludes that it is located at location C. The location of a mobile computer 20 can thus be determined through sensing the signal strength from each of a number of base stations. As is known by those skilled in the art, the Euclidean distance is just one possible distance metric. Other distance metrics such as sum of absolute value differences, or weighted Euclidean are also possible.

Rather than merely comparing the detected values to a single row of the table, the present invention also contemplates finding several rows of the table, each of which contains values similar to those observed. Such a multiple nearest neighbor approach, spatially averages multiple locations at which the empirically determined signal strengths from the base stations are similar to those measured by a mobile computer seeking to determine its location. As will be known by those of skill in the art, spatial averaging involves averaging the individual coordinate values of the locations. Therefore, it is necessary to define a consistent coordinate system, such as using a corner of the building as the origin (0,0). Returning to the example above, the values detected by mobile computer 78, namely 38 dB, 23 dB, and 24 dB, respectively are similar to the entries for a number of rows in addition to row C selected above. Using the multiple nearest neighbor approach, we find rows A and B are also similar to the detected values. These three "nearest neighbors": A, B, and C, are spatially averaged to determine the location of mobile computer 78. As will be apparent to one of skill in the art, the multiple nearest neighbor approach can be implemented with any number of "neighbors".

A variation of the multiple nearest neighbor approach using weighting is also contemplated by the present invention. If one set of signal strength values are very similar to the values detected by the mobile computer 20, it may be that the position corresponding to those values is more accurate than any other position at which an empirical measurement was taken. That does not mean, however, that the multiple nearest neighbor approach cannot improve the accuracy of that position determination. However, because there exists a position which appears to be near the actual position of the mobile computer, only minor changes to that position should be caused as a result of the multiple nearest neighbor approach. In such a case, a weighted multiple nearest neighbor approach may be appropriate. A weighted multiple nearest neighbor approach multiplies the coordinates of each "neighbor" location by a weighting factor prior to averaging them. If a position appears to be a particularly good match, then the coordinates of that position would by multiplied by a larger weighting factor than the other positions. In such a manner, the weighted multiple nearest neighbor approach would cause less deviation from the perceived best position, yet would provide a minor position adjustment which could result in even greater accuracy.

The present invention also contemplates locating a mobile device by measuring the signal strength from the mobile device as received by several base stations. As will be evident to those skilled in the art, such a method is the inverse of the method described above. Returning to FIG. 2, a computer 84 can also be connected to the base stations 72, 74, and 76, through the network 70. Computer 84 can monitor the signal strength from a particular mobile computer 20 as received by the base stations near that mobile computer. Because it is connected to all of the base stations, the computer 84 can also generate the table which relates the position of the mobile computer 20 to the strength of the signal from the mobile computer as received by each of the base stations. Returning to FIG. 4, as explained above, empirical data can be gathered by sampling the signal strength from the mobile computer, as it is moved throughout the building. In this case, however, the table generated by computer 84 as a result of the sampling will contain the signal strength of the signal from the mobile computer as detected at each base station, instead of the signal strength of the signal from each base station as detected at the mobile computer. The computer 84 can collect the signal strength information as received by each base station and create a table such as Table 2 below.

TABLE 2

| Location of User | SNR at Base 72 | SNR at Base 74 | SNR at Base 76 |
|---|---|---|---|
| A | 30 dB | 10 dB | 10 dB |
| B | 35 dB | 20 dB | 20 dB |
| C | 25 dB | 15 dB | 15 dB |
| D | 20 dB | 20 dB | 20 dB |
| E | 30 dB | 25 dB | 25 dB |
| F | 15 dB | 30 dB | 20 dB |
| G | 15 dB | 35 dB | 25 dB |
| H | 10 dB | 30 dB | 30 dB |
| I | 15 dB | 25 dB | 30 dB |
| J | 20 dB | 20 dB | 25 dB |
| K | 25 dB | 15 dB | 20 dB |
| L | 30 dB | 10 dB | 30 dB |
| M | 15 dB | 20 dB | 35 dB |

As can be seen from a comparison of Table 1 above and Table 2 above, the tables are similar with respect to the relationship between the signal strengths in any one row. Even though the signal strength measured at the mobile computer 20 and the base station 76 are similar in value, there is no requirement that they be so. The two signals travel the same path and encounter the same obstacles which degrade the signal. The only difference can be the power of the transmitting devices themselves: the base station, since it does not need to conserve power, may be transmitting at a higher power than the wireless network interface 53 on the mobile computer 20. For example, the Federal Communications Commission (FCC) allows wireless networks to use up to 1 Watt of transmitting power, which can be easily met by the base station. The wireless network interface 53, however, typically transmits in the 50–100 mW range so as to conserve the battery power of the mobile computer 20.

Therefore, as can be seen by comparing Table 1 and Table 2, the signals received by the base stations in Table 2 are weaker than those received by the mobile computer from the base stations in Table 1. However, because the signals in both directions are equally affected by distance and obstacles, the relationship between the signals in a row remains the same. For example, at location A in Table 1 the signal from base station 72 is stronger than the signals from base stations 74 and 76 because of the distance and the obstacles between location A and base stations 74 and 76. This is the same reason that in Table 2, at location A, the signal from the mobile computer at location A is stronger when detected by base station 72 than when detected by base stations 74 and 76. Because the mobile computer does not transmit its signals with as much power, the SNR is lower in Table 2 than in Table 1.

As described above, multiple measurements taken at several different orientations of the mobile computer 20 can be used to eliminate the effect of the user's body on the signal strength when creating a table such as Table 2. Additionally, as described above, taking multiple measurements at each location can improve the accuracy of the values in the table, as it minimizes the effects of random interference and noise.

The multiple nearest neighbor method described in detail above can also be used with the data in Table 2. For example, the computer 84 can determine that the strength of the signal from mobile computer 78, as shown in FIG. 4, is 28 dB as detected by base station 72, 13 dB as detected by base station 74, and 14 dB as detected by base station 76. Comparing these values to Table 3, we find locations A, B, and C as the nearest "neighbors" to the values obtained. The nearest neighbors are then spatially averaged to calculate the location of mobile computer 78. As above, the use of the multiple nearest neighbor method requires the use of a consistent coordinate system. Also, a weighted multiple nearest neighbor approach, as described above, can be used with a table such as Table 3.

An alternative method to empirically deriving Tables 1 or 2 above, contemplated by the present invention, requires mathematically estimating the attenuation in the signal as due to the distance between the transmitter and the receiver, and the intervening walls. As is known by those skilled in the art, the transmissions in a wireless network conform to general radio propagation theories. Most notably the signal strength of the transmissions becomes weaker as the distance from the transmitting source increases, and the signal strength of the transmissions decreases when the signals must pass through walls. Research into the field of electromagnetic waves has yielded a number of useful mathematical formulas. For example, it is known that signal strength decreases with distance. It is also known that walls attenuate signals by a determinable factor, known as the Wall Attenuation Factor (WAF). The WAF is dependent oh the thickness of the wall, and the materials used in the construction of the wall. The WAF can be determined empirically by placing a receiver on one side of a wall and a transmitter on the other, and detecting the attenuation of the signal through the wall.

One method for determining a WAF can be found in the article entitled "914 MHz Path Loss Prediction Models for Indoor Wireless Communications in Multifloored Buildings" by Scott Y. Seidel and Theorodre S. Rappaport, which appeared in IEEE Transactions On Antennas and Propagation, Volume 40, Number 2, February 1992, the teachings of which are hereby incorporated by reference.

The signal strength at a particular location can, therefore, be defined as the signal strength as attenuated by distance and walls that the signal had to pass through. In mathematical terms, the formula can be expressed as follows: the signal strength, or power P, at a given distance d is calculated as $$P(d) = P(d_0) - 10n\log\left(\frac{d}{d_0}\right) + \begin{cases} nW(WAF) & nW < C \\ C(WAF) & nW \geq C \end{cases}.$$

The first term is the signal strength at a reference distance $d_0$. The reference distance can be chosen to be a convenient distance and the signal strength at that distance can be determined empirically. If the reference distance is chosen to be one meter from the emitter itself, then the signal strength may be available from the specifications of the device, eliminating the need for empirical determination. The second term in the equation provides the attenuation in the signal strength due to the distance between the point at which the signal strength is sought to be calculated, and the reference point at which the signal strength is known. The variable n is the path loss component which indicates the rate at which the signal strength decreases with distance. The second term is subtracted from the first term, and thus, reduces the reference signal strength if the desired point is further from the transmitter than the reference point. The third term in the equation quantifies the attenuation due to the number of walls the signal must pass through. The term nW represents the number of walls and the WAF can be determined empirically, as described above. Thus, the product of the two yields the attenuation due to all of the walls. As explained above, the WAF is a negative number, resulting in a reduction to the calculated signal strength. After a certain number of walls, however, the signal becomes so weak that further degradation is not mathematically significant. This practical limit is C walls, where C can be selected by the user to satisfy that user's accuracy requirements. After C number of walls, therefore, the attenuation factor can simply be expressed as C multiplied by the WAF.

Figure 5:
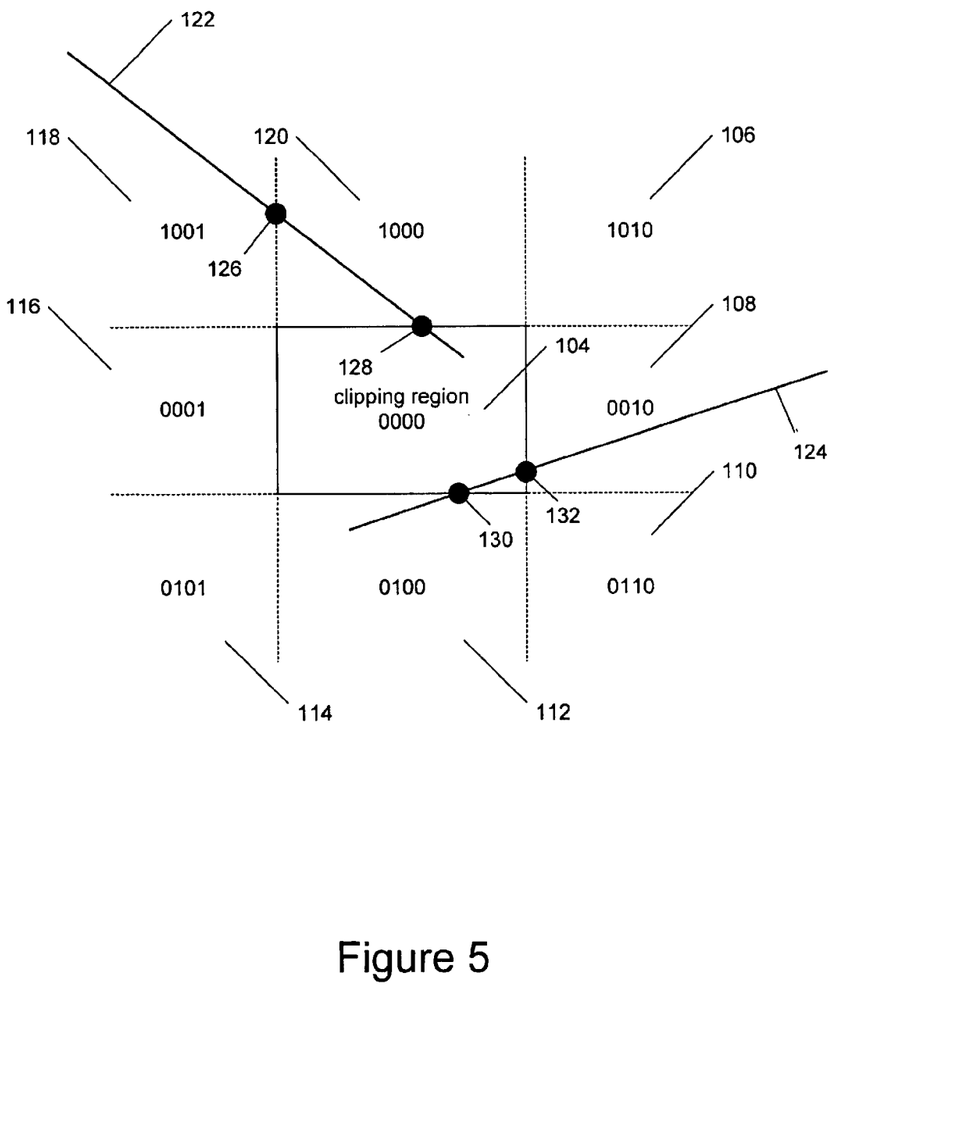
FIG. 5 is a diagram generally illustrating the operation of a line-lipping algorithm.

The number of walls between a signal source and the location for which the signal strength is to be calculated can be determined by automated means. For example, in one realization of this invention, the building is divided into non-overlapping but connected rectangular regions, as defined by the walls inside the building. A straight line between the base station 76 and the location of the mobile personal computer 80, indicating the path the signal would take when no walls are present are considered. Cohen-Sutherland Line Clipping Algorithm can then be used to determine the number of walls between the source and receiver. Line clipping is the deletion of a part of a line segment which lies outside a clip area. Once the line clipping is performed, the remaining line segment lies completely within a clip area. The algorithm divides the region outside of the clipping area into areas with "outcodes". Each digit of the binary outcode represents whether the particular region lies above, below, or to the left or right of a clipping area. As is shown in FIG. 5, a four binary digit outcode can be used. The first digit indicates whether the region is above the clipping region 104. For example, regions 118, 120, and 106 are all above region 104, as indicated by the dashed lines, and those regions all have a binary 1 as the value of the first digit. The second digit indicates whether the region is below the clipping region 104. Thus, regions 114, 112, and 110 all have a binary 1 as the value of the second digit since they are below the clipping region 104. Regions 108 and 116 are adjacent to the clipping region and therefore both the first and second binary digits are 0, since adjacent regions are neither above nor below the clipping region. Similarly, the third binary digit indicates whether the region is to the right of the clipping region 104, and the fourth binary digit indicates whether the region is to the left of the clipping region. The clipping region 104 itself has an outcode of 0000 because, by definition, it is nether above, nor below, and neither to the left nor to the right of itself.

Once this subdivision occurs, all lines through the clipping region, such as lines 122 and 124 shown in FIG. 5, are divided by the boundaries of the regions described above, as shown at points 126 and 128 for line 122, and points 130 and 132 for line 124. A key feature of the outcodes is that the binary digits which have a value of 1 correspond to boundaries between the regions, which are crossed. For example, line 122 has two endpoints: one in region 0000 and another in region 1001. The significance of outcode 1001 is that the line must intersect the top and left boundaries because the first digit indicates it is above the clipping region and the last digit indicates it is to the left of the clipping region, as described above. Whenever a point on the line changes its outcode value, by definition the line has crossed a boundary. It is possible that this line intersects a number of rectangular regions. For example, the office layout from FIGS. 3 and 4 can be divided into regions with outcodes as shown in FIG. 5. The Cohen-Sutherland Line Clipping Algorithm is described further in Chapter 3.11 of Computer Graphics Principles and Practice, Second Edition by Foley et al., published in 1990, the teachings of which are incorporated herein by reference.

Figure 6:
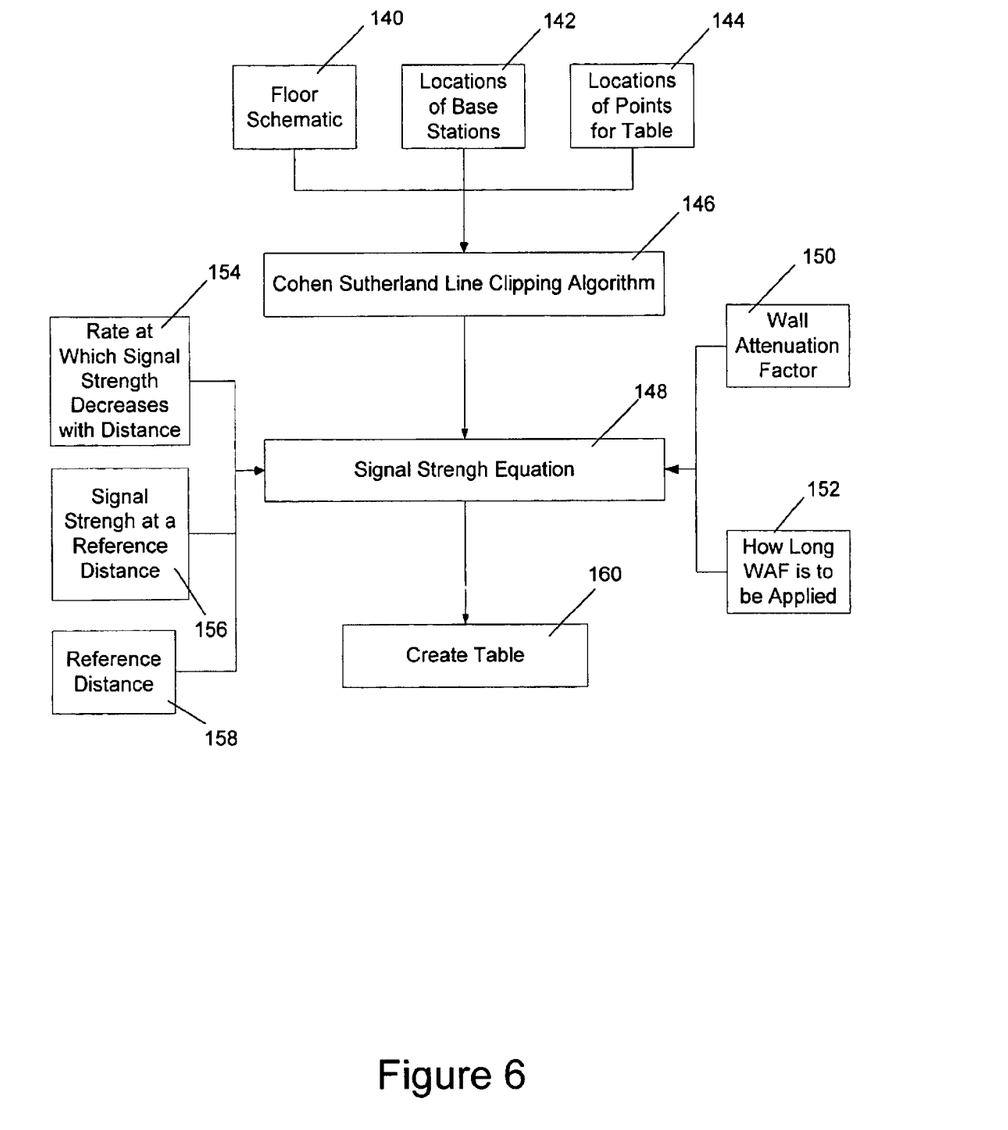
FIG. 6 is a flow chart generally illustrating the operation of a mathematical derivation of a signal strength table according to the present invention.

Turning to FIG. 6, at step 140, the floor schematic is entered into a computer as an input to the Cohen-Sutherland Line Clipping Algorithm. Similarly, at step 142 the locations of the base stations are entered, and at step 144 the locations at which the signal strength is to be calculated are entered. The Cohen-Sutherland Line Clipping Algorithm at step 146 will then determine, as described above, the number of walls between each of the base stations and the locations at which the signal strength is to be calculated. This number is then used in the signal strength equation, given above, at step 148.

In addition to the number of walls, the WAF, empirically derived as described above, is entered at step 150. At step 152, the limiting factor C is selected by the user. The variable n, the rate at which signal strength decreases with distance, is provided at step 154. The reference distance and the signal strength at that reference distance, as described above, are provided in steps 158 and 156 respectively. The signal strength equation given above can then, at step 148, calculate the signal strength at each of the locations entered in step 144. The output of the signal strength equation is entered into a table, such as Table 1 or Table 2, above, at step 160.

The mathematical estimation can be used to derive both a table containing the values of the signal strength from various base stations as detected by a mobile computer 20 and the values of the signal strength from a mobile computer 20 as detected by various base stations. As would be known by those of skill in the art, the variables in the signal strength equation would be different depending on which method was used. For example, to calculate the signal strength from a base station, as detected by a mobile computer at a particular location, the reference distance should be set close to the base station, or even at one meter from the base station, as described above, and the term n would be the rate at which the signal strength of the base station decreased with distance.

Conversely, to calculate the signal strength from a mobile computer 20 at a particular location, as detected by a base station, the reference distance should be set close to the mobile computer, such as one meter away, and the term n would be the rate at which the signal strength of the mobile computer 20 decreased with distance.

The present invention also contemplates providing for environmental factors by environmentally profiling the system. The base stations are all located at known locations, as shown in FIGS. 3 and 4. One base station could send out a signal to be received by the other base stations, in the same way that the base stations would receive a signal from a mobile computer. For example, with reference to FIG. 3, base station 72 could emit a signal to be detected by base stations 74 and 76. Using a table generated by the signal strength equation given above, the computer 84 could receive the signal of base station 72, as detected by base stations 74 and 76, and determine the location of base station 72. This would be done in the same manner that computer 84 would determine the location of a mobile computer 20 from its signal strength as detected at the base stations, as described above.

The computer 84 can then compare the calculated location to the known location of base station 72. If there is a difference between the two, the inputs to the variables in the signal strength equation, given above for estimating the signal strength at a particular location, can be varied. For example, the n value, or the WAF, could be changed, and a new table recalculated. This new table would then be used by computer 84 to calculate again the position of base station 72. The computer 84 could then again compare the new calculated location of base station 72 to the known location and determine the difference. The above iteration can be performed multiple times. The computer 84 could determine which values of the variables in the signal strength equation yielded the most accurate results, and then use those values to generate the table, which would, in turn, be used to calculate the position of the mobile computers. The values of the variables could also be passed to the mobile computer 20 along with a map of the building, so that it can generate a table within itself, and determine its location based on the strength of the signal from various base stations, as described above. As would be known by those of skill in the art, the variables in the signal strength equation could be varied beforehand, generating numerous tables. The above method could then be used to select the most accurate table of the group generated. In either case, the environmentally profiled tables could result in more accurate calculations. Because factors which affect signal strength, such as the number of people present, can vary, the system can be programmed to profile and tune itself, as described above, multiple times.

An alternative environmental profiling mechanism can be implemented by empirically deriving more than once the table relating the position of the mobile computer to the signal strength. As described above, a table relating the position of the mobile computer to the signal strength, such as Tables 1 or 3, can be derived empirically. Such empirical derivations can be performed numerous times, under different environmental conditions, and at different times of the day. Environmental conditions can be impacted by the temperature, the number of people in the building, the amount of human traffic in the building, and whether it is day or night. Then, as above, the base stations could test the system by attempting to use the tables to determine the location of a given base station and then comparing the calculated location to the true location. The table that results in the greatest accuracy would then be used. In this way, the system could avoid the complexity of calculating the signal strength. As above, the system could be programmed to environmentally profile itself periodically.

As can be seen from the foregoing detailed description, the present invention is directed to a system and a method for determining the location of a mobile computer and its user based on the strength of wireless signals from the WLAN to which the computer is connected. The present invention can also be implemented by a dedicated system providing base stations and receiver/transmitters on the mobile computer. Similarly, the present invention can operate on any wireless mechanism, which does not require a line-of-site between the receiver and transmitter, such as radio frequency (RF) transmissions of varying wavelengths and ultra-sound transmissions. The present invention is equally applicable to a wireless system that interconnects other mobile units, in addition to mobile personal computer 20, such as cordless phones, CB radios, two-way radios, or the like.

All of the references cited herein, including patents, patent applications, and publications, are hereby incorporated by reference in their entireties.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for determining a location of a mobile unit, comprising: measuring a wireless signal strength; comparing the measured wireless signal strength to an environmentally profiled table of wireless signal strengths and known locations of the mobile unit, wherein the environmentally profiled table is selected based on the selected table having a closest determined location of a base station from among a plurality of tables of wireless signal strengths and the known locations of the mobile unit, which tables reflect the influence of environmental factors; finding a table entry whose wireless signal strength is closest, by distance in signal space, to the measured wireless signal strength; and, determining the location of the mobile unit with reference to the found table entry.

2. The method of claim 1 wherein the determining the location of the mobile unit with reference to the found table entry includes determining the location of the mobile unit to be proximate to a known location corresponding to the found table entry.

3. The method of claim 1 wherein the finding the table entry whose wireless signal strength is most similar to the measured wireless signal strength includes finding a plurality of table entries and wherein the determining the location of the mobile unit with reference to the found table entry includes determining the location of the mobile unit to be proximate to a spatial average of known locations corresponding to the found plurality of table entries.

4. The method of claim 3 wherein the determining the location of the mobile unit to be proximate to a spatial average of known locations corresponding to the found plurality of table entries includes multiplying each of the corresponding known locations by a weighting factor prior to the spatial averaging of the corresponding known locations.

5. The method of claim 1 wherein the environmentally profiled table is selected from the plurality of tables of wireless signal strengths and the known locations of the mobile unit by a method using at least two base stations, a first base station at a known first base station location and a second base station, the method comprising: (a) generating the plurality of tables of wireless signal strengths and the known locations; (b) measuring, at the first base station, a wireless signal strength of the second base station; (c) comparing the measured wireless signal strength of the second base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the second base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

6. The method of claim 5 wherein the generating the plurality of tables of wireless signal strengths and the known locations includes generating the plurality of tables by a method comprising: (a) measuring the wireless signal strength of a base station as received by the mobile unit in a known location; (b) entering, as an entry in the table, the mobile unit's known location and the wireless signal strength, at the mobile unit's known location, of the base station; and repeating steps (a) and (b) under different environmental conditions.

7. The method of claim 6 wherein the measuring the wireless signal strength of the base station includes measuring, at the mobile unit in the mobile unit's known location, the wireless signal strength of the base station in a plurality of orientations of the mobile unit.

8. The method of claim 7 wherein the entering the mobile unit's known location and the measured wireless signal strength of the base station includes entering a maximum wireless signal strength of the base station in the plurality of orientations of the mobile unit.

9. The method of claim 5 wherein the generating the plurality of tables of wireless signal strengths and the known locations includes generating the plurality of tables by a method comprising: (a) calculating a mathematically estimated wireless signal strength of a base station at one of the known locations; (b) entering, as an entry in the table, the one of the known locations and the mathematically estimated wireless signal strength, at the one of the known locations, of the base station; and repeating steps (a) and (b) with a different value for a variable in the calculation of the mathematically estimated wireless signal strength of the base station at the one of the known locations.

10. The method of claim 9 wherein the different value for the variable in the calculation and the variable in the calculation are selected with reference to the computed deviation.

11. The method of claim 1 wherein the environmentally profiled table is selected from the plurality of tables of wireless signal strengths and the known locations of the mobile unit by a method using at least two base stations, a first base station at a known first base station location and a second base station, the method comprising: (a) generating the plurality of tables of wireless signal strengths and the known locations; (b) measuring, at the second base station, a wireless signal strength of the first base station; (c) comparing the measured wireless signal strength of the first base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the first base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

12. The method of claim 11 wherein the generating the plurality of tables of wireless signal strengths and the known locations includes generating the plurality of tables by a method comprising: (a) measuring, at a base station, the wireless signal strength of the mobile unit in a known location; (b) entering, as an entry in the table, the mobile unit's known location and the measured wireless signal strength of the mobile unit at the mobile unit's known location; and repeating steps (a) and (b) under different environmental conditions.

13. The method of claim 12 wherein the measuring the wireless signal strength of the mobile unit in the mobile unit's known location includes measuring, at the base station, the wireless signal strength of the mobile unit in a plurality of orientations at the mobile unit's known location.

14. The method of claim 13 wherein the entering the mobile unit's known location and the measured wireless signal strength of the mobile unit includes entering a maximum wireless signal strength of the mobile unit in the plurality of orientations at the mobile unit's known location.

15. The method of claim 11 wherein the generating the plurality of tables of wireless signal strengths and the known locations includes generating the plurality of tables by a method comprising: (a) calculating a mathematically estimated wireless signal strength, at a base station, of the mobile unit at one of the known locations; (b) entering, as an entry in the table, the one of the known locations and the mathematically estimated wireless signal strength, at the base station, of the mobile unit in the one of the known locations; and repeating steps (a) and (b) with a different value for a variable in the calculation of the mathematically estimated wireless signal strength, at the base station, of the mobile unit at the one of the known locations.

16. The method of claim 15 wherein the different value for the variable in the calculation and the variable in the calculation are selected with reference to the computed deviation.

17. A computer-readable medium having computer-executable instructions for performing steps, comprising: measuring a wireless signal strength; comparing the measured wireless signal strength to an environmentally profiled table of wireless signal strengths and known locations of the mobile unit, wherein the environmentally profiled table is selected based on the selected table having a closest determined location of a base station from among a plurality of tables of wireless signal strengths and the known locations of the mobile unit, which tables reflect the influence of environmental factors; finding a table entry whose wireless signal strength is closest, by distance in signal space, to the measured wireless signal strength; and, determining the location of the mobile unit with reference to the found table entry.

18. The computer-readable medium of claim 17 wherein the determining the location of the mobile unit with reference to the found table entry includes determining the location of the mobile unit to be proximate to a known location corresponding to the found table entry.

19. The computer-readable medium of claim 17 wherein the finding the table entry whose wireless signal strength is most similar to the measured wireless signal strength includes finding a plurality of table entries and wherein the determining the location of the mobile unit with reference to the found table entry includes determining the location of the mobile unit to be proximate to a spatial average of known locations corresponding to the found plurality of table entries.

20. The computer-readable medium of claim 19 wherein the determining the location of the mobile unit to be proximate to a spatial average of known locations corresponding to the found plurality of table entries includes multiplying each of the corresponding known locations by a weighting factor prior to the spatial averaging of the corresponding known locations.

21. The computer-readable medium of claim 17 wherein the environmentally profiled table is selected from the plurality of tables of wireless signal strengths and the known locations of the mobile unit with computer-executable instructions for performing steps, using at least two base stations, a first base station at a known first base station location and a second base station, the steps comprising: (a) generating the plurality of tables of wireless signal strengths and the known locations; (b) measuring, at the first base station, a wireless signal strength of the second base station; (c) comparing the measured wireless signal strength of the second base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the second base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

22. The computer-readable medium of claim 21 wherein the generating the plurality of tables of wireless signal strengths and the known locations includes generating the plurality of tables with computer-executable instructions for performing steps comprising: (a) measuring the wireless signal strength of a base station as received by the mobile unit in a known location; (b) entering, as an entry in the table, the mobile unit's known location and the wireless signal strength, at the mobile unit's known location, of the base station; and repeating steps (a) and (b) under different environmental conditions.

23. The computer-readable medium of claim 22 wherein the measuring the wireless signal strength of the base station includes measuring, at the mobile unit in the mobile unit's known location, the wireless signal strength of the base station in a plurality of orientations of the mobile unit.

24. The computer-readable medium of claim 23 wherein the entering the mobile unit's known location and the measured wireless signal strength of the base station includes entering a maximum wireless signal strength of the base station in the plurality of orientations of the mobile unit.

25. The computer-readable medium of claim 21 wherein the generating the plurality of tables of wireless signal strengths and the known locations includes generating the plurality of tables with computer-executable instructions for performing steps comprising: (a) calculating a mathematically estimated wireless signal strength of a base station at one of the known locations; (b) entering, as an entry in the table, the one of the known locations and the mathematically estimated wireless signal strength, at the one of the known locations, of the base station; and repeating steps (a) and (b) with a different value for a variable in the calculation of the mathematically estimated wireless signal strength of the base station at the one of the known locations.

26. The computer-readable medium of claim 25 wherein the different value for the variable in the calculation and the variable in the calculation are selected with reference to the computed deviation.

27. The computer-readable medium of claim 17 wherein the environmentally profiled table is selected from the plurality of tables of wireless signal strengths and the known locations of the mobile unit with computer-executable instructions for performing steps, using at least two base stations, a first base station at a known first base station location and a second base station, the steps comprising: (a) generating the plurality of tables of wireless signal strengths and the known locations; (b) measuring, at the second base station, a wireless signal strength of the first base station; (c) comparing the measured wireless signal strength of the first base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the first base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

28. The computer-readable medium of claim 27 wherein the generating the plurality of tables of wireless signal strengths and the known locations includes generating the plurality of tables with computer-executable instructions for performing steps comprising: (a) measuring, at a base station, the wireless signal strength of the mobile unit in a known location; (b) entering, as an entry in the table, the mobile unit's known location and the measured wireless signal strength of the mobile unit at the mobile unit's known location; and repeating steps (a) and (b) under different environmental conditions.

29. The computer-readable medium of claim 28 wherein the measuring the wireless signal strength of the mobile unit in the mobile unit's known location includes measuring, at the base station, the wireless signal strength of the mobile unit in a plurality of orientations at the mobile unit's known location.

30. The computer-readable medium of claim 29 wherein the entering the mobile unit's known location and the measured wireless signal strength of the mobile unit includes entering a maximum wireless signal strength of the mobile unit in the plurality of orientations at the mobile unit's known location.

31. The computer-readable medium of claim 27 wherein the generating the plurality of tables of wireless signal strengths and the known locations includes generating the plurality of tables with computer-executable instructions for performing steps comprising: (a) calculating a mathematically estimated wireless signal strength, at a base station, of the mobile unit at one of the known locations; (b) entering, as an entry in the table, the one of the known locations and the mathematically estimated wireless signal strength, at the base station, of the mobile unit in the one of the known locations; and repeating steps (a) and (b) with a different value for a variable in the calculation of the mathematically estimated wireless signal strength, at the base station, of the mobile unit at the one of the known locations.

32. The computer-readable medium of claim 31 wherein the different value for the variable in the calculation and the variable in the calculation are selected with reference to the computed deviation.

33. A method for creating an environmentally profiled table of wireless signal strengths and known locations using at least two base stations, a first base station at a known first base station location and a second base station, the method comprising: (a) generating a plurality of tables of wireless signal strengths and the known locations; (b) measuring, at the first base station, a wireless signal strength of the second base station; (c) comparing the measured wireless signal strength of the second base station to one of the plurality of tables of wireless signal strengths and the known locations; (d) finding an entry in the one of the plurality of tables of wireless signal strengths and the known locations whose wireless signal strength is closest by distance in signal space, to the measured signal strength of the second base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

34. The method of claim 33 wherein the generating the plurality of tables of wireless signal strengths and the known locations includes generating the plurality of tables by a method comprising: (a) measuring the wireless signal strength of a base station as received by the mobile unit in a known location; (b) entering, as an entry in the table, the mobile unit's known location and the wireless signal strength, at the mobile unit's known location, of the base station; and repeating steps (a) and (b) under different environmental conditions.

35. The method of claim 33 wherein the generating the plurality of tables of wireless signal strengths and the known locations includes generating the plurality of tables by a method comprising: (a) calculating a mathematically estimated wireless signal strength of a base station at one of the known locations; (b) entering, as an entry in the table, the one of the known locations and the mathematically estimated wireless signal strength, at the one of the known locations, of the base station; and repeating steps (a) and (b) with a different value for a variable in the calculation of the mathematically estimated wireless signal strength of the base station at the one of the known locations.

36. A method for creating an environmentally profiled table of wireless signal strengths and known locations using at least two base stations, a first base station at a known first base station location and a second base station, the method comprising: (a) generating the plurality of tables of wireless signal strengths and the known locations; (b) measuring, at the second base station, a wireless signal strength of the first base station; (c) comparing the measured wireless signal strength of the first base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the first base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

37. The method of claim 36 wherein the generating the plurality of tables of wireless signal strengths and the known locations includes generating the plurality of tables by a method comprising: (a) measuring, at a base station, the wireless signal strength of the mobile unit in a known location; (b) entering, as an entry in the table, the mobile unit's known location and the measured wireless signal strength of the mobile unit at the mobile unit's known location; and repeating steps (a) and (b) under different environmental conditions.

38. The method of claim 36 wherein the generating the plurality of tables of wireless signal strengths and the known locations includes generating the plurality of tables by a method comprising: (a) calculating a mathematically estimated wireless signal strength, at a base station, of the mobile unit at one of the known locations; (b) entering, as an entry in the table, the one of the known locations and the mathematically estimated wireless signal strength, at the base station, of the mobile unit in the one of the known locations; and repeating steps (a) and (b) with a different value for a variable in the calculation of the mathematically estimated wireless signal strength, at the base station, of the mobile unit at the one of the known locations.

39. A method for determining a location of a mobile unit, comprising: measuring a wireless signal strength; comparing the measured wireless signal strength to an environmentally profiled table of wireless signal strengths and known locations of the mobile unit, wherein the environmentally profiled table is selected from a plurality of tables of wireless signal strengths and the known locations of the mobile unit, which tables reflect the influence of environmental factors; finding a plurality of table entries whose wireless signal strength is closest, by distance in signal space, to the measured wireless signal strength; and, determining the location of the mobile unit to be proximate to a spatial average of known locations corresponding to the found plurality of table entries, each corresponding known location having been multiplied by a weighting factor prior to the spatial averaging.

40. A computer-readable medium for creating an environmentally profiled table of wireless signal strengths and known locations using at least two base stations, a first base station at a known first base station location and a second base station, with computer-executable instructions for performing steps, comprising: (a) generating the plurality of tables of wireless signal strengths and the known locations; (b) measuring, at the first base station, a wireless signal strength of the second base station; (c) comparing the measured wireless signal strength of the second base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the second base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

41. The computer-readable medium of claim 40 wherein the generating the plurality of tables of wireless signal strengths and the known locations includes generating the plurality of tables with computer-executable instructions for performing steps comprising: (a) measuring the wireless signal strength of a base station as received by the mobile unit in a known location; (b) entering, as an entry in the table, the mobile unit's known location and the wireless signal strength, at the mobile unit's known location, of the base station; and repeating steps (a) and (b) under different environmental conditions.

42. The computer-readable medium of claim 40 wherein the generating the plurality of tables of wireless signal strengths and the known locations includes generating the plurality of tables with computer-executable instructions for performing steps comprising: (a) calculating a mathematically estimated wireless signal strength of a base station at one of the known locations; (b) entering, as an entry in the table, the one of the known locations and the mathematically estimated wireless signal strength, at the one of the known locations, of the base station; and repeating steps (a) and (b) with a different value for a variable in the calculation of the mathematically estimated wireless signal strength of the base station at the one of the known locations.

43. A computer-readable medium for creating an environmentally profiled table of wireless signal strengths and known locations using at least two base stations, a first base station at a known first base station location and a second base station, with computer-executable instructions for performing steps, comprising: (a) generating the plurality of tables of wireless signal strengths and the known locations; (b) measuring, at the second base station, a wireless signal strength of the first base station; (c) comparing the measured wireless signal strength of the first base station to one of the plurality of tables of wireless signal strengths and the known locations; (d) finding an entry in the one of the plurality of tables of wireless signal strengths and the known locations whose wireless signal strength is closest, by distance in signal space, to the measured wireless signal strength of the first base station; (e) determining a location of the first base station with reference to the found table entry; (f) computing a deviation by comparing the determined location of the first base station to the known first base station location; repeating steps (a) through (f) for each of the plurality of tables of wireless signal strengths and the known locations; and, selecting, as the environmentally profiled table, a table of the plurality of tables which minimized the deviation.

44. The computer-readable medium of claim 43 wherein the generating the plurality of tables of wireless signal strengths and the known locations includes generating the plurality of tables with computer-executable instructions for performing steps comprising: (a) measuring, at a base station, the wireless signal strength of the mobile unit in a known location; (b) entering, as an entry in the table, the mobile unit's known location and the measured wireless signal strength of the mobile unit at the mobile unit's known location; and repeating steps (a) and (b) under different environmental conditions.

45. The computer-readable medium of claim 43 wherein the generating the plurality of tables of wireless signal strengths and the known locations includes generating the plurality of tables with computer-executable instructions for performing steps comprising: (a) calculating a mathematically estimated wireless signal strength, at a base station, of the mobile unit at one of the known locations; (b) entering, as an entry in the table, the one of the known locations and the mathematically estimated wireless signal strength, at the base station, of the mobile unit in the one of the known locations; and repeating steps (a) and (b) with a different value for a variable in the calculation of the mathematically estimated wireless signal strength, at the base station, of the mobile unit at the one of the known locations.

46. A computer-readable medium having computer-executable instructions for performing steps, comprising: measuring a wireless signal strength; comparing the measured wireless signal strength to an environmentally profiled table of wireless signal strengths and known locations of the mobile unit, wherein the environmentally profiled table is selected from a plurality of tables of wireless signal strengths and the known locations of the mobile unit, which tables reflect the influence of environmental factors; finding a plurality of table entries whose wireless signal strength is closest, by distance in signal space, to the measured wireless signal strength; and, determining the location of the mobile unit to be proximate to a spatial average of known locations corresponding to the found plurality of table entries, each corresponding known location having been multiplied by a weighting factor prior to the spatial averaging.

* * * * *